US008125752B2

(12) United States Patent
Montena

(10) Patent No.: US 8,125,752 B2
(45) Date of Patent: Feb. 28, 2012

(54) COAXIAL BROADBAND SURGE PROTECTOR

(75) Inventor: Noah Montena, Syracuse, NY (US)

(73) Assignee: John Mezzalingua Associates, Inc., East Syracuse, NY (US)

(*) Notice: Subject to any disclaimer, the term of this patent is extended or adjusted under 35 U.S.C. 154(b) by 398 days.

(21) Appl. No.: 12/425,728

(22) Filed: Apr. 17, 2009

(65) Prior Publication Data

US 2010/0265625 A1 Oct. 21, 2010

(51) Int. Cl.
*H02H 1/00* (2006.01)
*H02H 1/04* (2006.01)
*H02H 3/22* (2006.01)
*H02H 9/06* (2006.01)
*H01C 7/12* (2006.01)

(52) U.S. Cl. ......... 361/120; 361/117; 361/118; 361/119

(58) Field of Classification Search .................. 361/120, 361/117, 118, 119
See application file for complete search history.

(56) References Cited

U.S. PATENT DOCUMENTS 3,758,700 A 9/1973 Ditscheid
4,107,567 A 8/1978 Cunningham et al.
4,187,526 A 2/1980 Heinze et al.
4,320,435 A 3/1982 Jones
4,359,764 A 11/1982 Block
4,493,003 A 1/1985 Mickelson et al.
5,380,211 A 1/1995 Kawaguchi et al.
5,436,787 A 7/1995 Ballinger
5,738,546 A 4/1998 Burroughs et al.
5,790,361 A 8/1998 Minich
5,790,362 A 8/1998 Kasahara et al.
5,957,724 A * 9/1999 Lester .......................... 439/578
6,003,012 A 12/1999 Nick
6,009,406 A 12/1999 Nick
6,061,223 A 5/2000 Jones et al.
6,115,227 A 9/2000 Jones et al.
6,225,813 B1 5/2001 Garwatoski (Continued)

FOREIGN PATENT DOCUMENTS

JP 61224601 10/1986

OTHER PUBLICATIONS

PCT/US2010/030962 International Search Report and Written Opinion. Date of Mailing: Nov. 26, 2010, 9 pp.

*Primary Examiner* — Jared Fureman
*Assistant Examiner* — Lucy Thomas
(74) *Attorney, Agent, or Firm* — Schmeiser Olsen & Watts

(57) ABSTRACT

A high voltage surge protection device having a characteristic impedance includes a center conductor defining an axis, an electrically conductive outer body concentrically disposed in surrounding relation to the inner conductor, and a dielectric layer disposed between the center conductor and the outer body. An electrically conductive surge protective element having a first value of effective impedance is disposed in electrical contact with the outer body and in spaced-apart relationship with the center conductor. The spaced-apart relationship forms a gap between the surge protective element and the center conductor. An insulative tuning element having a second value of effective impedance larger than the first value of effective impedance is coupled to the surge protective element in impedance-restorative relationship. The combination of the first value of effective impedance and the second value of effective impedance effectively equals the characteristic impedance of the high voltage surge protection device.

24 Claims, 9 Drawing Sheets

U.S. PATENT DOCUMENTS

| | | | |
|---|---|---|---|
| 6,236,551 | B1 | 5/2001 | Jones et al. |
| 6,636,408 | B2 | 10/2003 | Pagliuca |
| 6,683,773 | B2 | 1/2004 | Montena |
| 6,724,605 | B1 | 4/2004 | Boy et al. |
| 6,849,799 | B2 | 2/2005 | Springer et al. |
| 7,092,230 | B2 | 8/2006 | Inauen |
| 7,102,868 | B2 | 9/2006 | Montena |
| 7,161,785 | B2 | 1/2007 | Chawgo |
| 7,324,318 | B2 | 1/2008 | Harwath et al. |
| 7,420,794 | B2 | 9/2008 | Olcen |
| 2003/0043524 | A1 | 3/2003 | Shikano et al. |
| 2003/0043525 | A1 | 3/2003 | Ryman |

* cited by examiner

COAXIAL BROADBAND SURGE PROTECTOR

FIELD OF THE INVENTION

This invention is directed generally to surge protectors and, more particularly, relates to a coaxial broadband surge protector for use in high frequency communications systems.

BACKGROUND OF THE INVENTION

In the wireless communication industry, a base station is typically connected to a transmission tower using 50 ohm coaxial cable. Transmission towers are frequently the target of lightning strikes. Despite best efforts to adequately ground the towers, occasionally high voltage surges are transmitted through the coaxial cable. If the high voltage surge is permitted to be picked up by the center conductor of the coaxial cable and transmitted along the distribution network, electrical devices within the interconnects and along the distribution path would become inoperable due to the electrical components essentially melting or otherwise deteriorating as a consequence of the surge. Replacing the components can be expensive, time-consuming, and result in down-time for the cellular tower operator. To mitigate the effect of lightning strikes on the antenna tower, a surge protector is typically installed in line with the coaxial cable to prevent the passage of dangerous surges and spikes that could damage electronic equipment. During normal operation, microwave and radio frequency signals are passed through the surge protector without interruption. In the event of a lightning strike or other surge in voltage and/or current, the surge protector shunts the surge to ground.

One type of surge protector used in the coaxial cable for antenna towers is a quarter wave stub device, which has a tee-shaped configuration including a coaxial through-section and a quarter-wave stub connected perpendicular to a middle portion of the coaxial through-section. The coaxial through-section is mated at either end with a standard connector. At the tee-shaped junction between the stub and the coaxial through-section, the center conductor and outer conductor of the stub are connected to the center and outer conductors of the coaxial through-section. At the terminal end of the stub, the center and outer conductors are connected together, thereby creating a short, which is connected to ground. The physical length of the stub is equal to one-quarter of the center frequency wavelength for the band of frequencies passing through the coaxial cable.

During normal operation, the quarter wave stub device permits signals within the desired frequency band to pass through the through-section. A portion of the desired signal encounters the stub portion at the tee junction and is scattered down the length of the stub, where it is reflected off the short-circuit and travels back to tee junction. Because the physical length of the stub is equal to one-quarter of the center frequency wavelength for the band of frequencies passing through the coaxial cable, the scattered signal portion adds in phase to the non-scattered signal portion and passes through to the opposite end of the coaxial through-section.

When a surge occurs in the transmission line, such as from a lightning strike, the physical length of the stub is much shorter than one-quarter of the center frequency wavelength because the surge is at a much lower frequency than the desired band of operating frequencies. Thus, the surge travels along the inner conductor of the coaxial through-section to the stub, through the stub to the short-circuit, and through the short-circuit to ground. Thus, the surge is diverted to ground by the surge protector.

One drawback to the quarter wave stub device is that it has limited capability to pass dc signals. This is a problem for cellular transmission towers that have tower-mounted amplifiers, where it may be necessary to pass up to 90 volts from the base station up to the tower through the coaxial cable.

Another drawback the to the quarter wave stub is that it has a limited operating bandwidth, passing only a narrow band of frequency signals. With the growing resistance from communities to add more cellular towers, many cellular carriers are co-locating their operating systems by duplexing or even triplexing their respective frequency bands. In this manner, the different frequency spectrum for each carrier are combined at the top of the tower, sent through a common broadband coaxial cable to the bottom of the tower, and split off to their respective antennas and radios. If a quarter wave stub is installed in the broadband coaxial line, it will pass only a small a small range of frequency signals and filter out the rest, thereby acting as a narrow pass band filter. This is completely undesirable if a particular carrier's signals are within the filtered range.

Co-located carriers may also run their own individual coaxial cable from the tower to the base station, but this approach is wasteful and requires wireless service providers or tower operators to stock a range of quarter wave stub surge protectors to accommodate all the commonly allocated operating bandwidths (e.g., 800-870 MHz, 824-896 MHz, 870-960 MHz, 1425-1535 MHz, 1700-1900 MHz, 1850-1990 MHz, 2110-2170 MHz, 2300-2485 MHz, etc.).

Another type of surge protector installed in-line with coaxial cable for antenna towers is the gas tube arrestor. A gas tube arrestor typically contains a gas capsule placed in between the center conductor and the outer conductor in the coaxial line. The gas in the tube is normally inert, but ionizes and becomes conductive when a threshold voltage potential is applied across it. The gas tube arrestor allows the operating signals to pass through the device under normal operation but, in the event of a surge, the gas ionizes and creates a current path from the center conductor to the outer conductor, thus shunting the surge to ground. When the voltage potential across the tube decreases below the threshold, the gas in the tube becomes inert again.

One drawback with gas tube arrestors is that the response time of the device allows a voltage spike to pass through the device in the time period before the gas ionizes and becomes conductive. Although this time period is only milliseconds, voltages as high as 1 kV may be passed through to equipment at the base station, which may be detrimental to the equipment.

Another drawback to gas tube arrestors is that, over time and with multiple surge events, the gas in the tube remains somewhat conductive and may "leak" current to ground. Also, there is no way of determining if the condition of the device is deteriorated until it fails to work during a surge event. Therefore, manufacturers recommend periodic replacement of the gas tube arrestors regardless of their condition, which wastes time, manpower, and money.

SUMMARY OF THE INVENTION

In view of the background, it is therefore an object of the present invention to provide a surge protector that will protect coaxial transmission lines from large voltage and current spikes and pass dc power in normal usage. Briefly stated, a high voltage surge protection device having a characteristic impedance includes a center conductor defining an axis, an electrically conductive outer body disposed in surrounding relation to the inner conductor, and a dielectric layer disposed between the center conductor and the outer body. An electrically conductive surge protective element having a first value of effective impedance is disposed in electrical contact with the outer body and in spaced-apart relationship with the center conductor. The spaced-apart relationship forms a gap between the surge protective element and the center conductor. An insulative tuning element having a second value of effective impedance larger than the first value of effective impedance is coupled to the surge protective element in impedance-restorative relationship. The combination of the first value of effective impedance and the second value of effective impedance effectively equals the characteristic impedance of the high voltage surge protection device.

According to an embodiment of the invention, a surge protector is provided wherein the gap is configured to discharge a voltage of greater than 500 volts.

According to another embodiment of the invention, the surge protection device includes a plurality of n electrically conductive surge protective elements having n values of effective impedance. The first value of effective impedance includes a combination of the n values of effective impedance.

According to another embodiment of the invention, the surge protection device includes a plurality of m insulative tuning elements having m effective impedance values. The second effective impedance value comprises a combination of the m values of effective impedance.

BRIEF DESCRIPTION OF THE DRAWINGS

The novel features that are characteristic of the preferred embodiment of the invention are set forth with particularity in the claims. The invention itself may be best be understood, with respect to its organization and method of operation, with reference to the following description taken in connection with the accompanying drawings in which:

DETAILED DESCRIPTION OF THE PREFERRED EMBODIMENT

Figure 1:
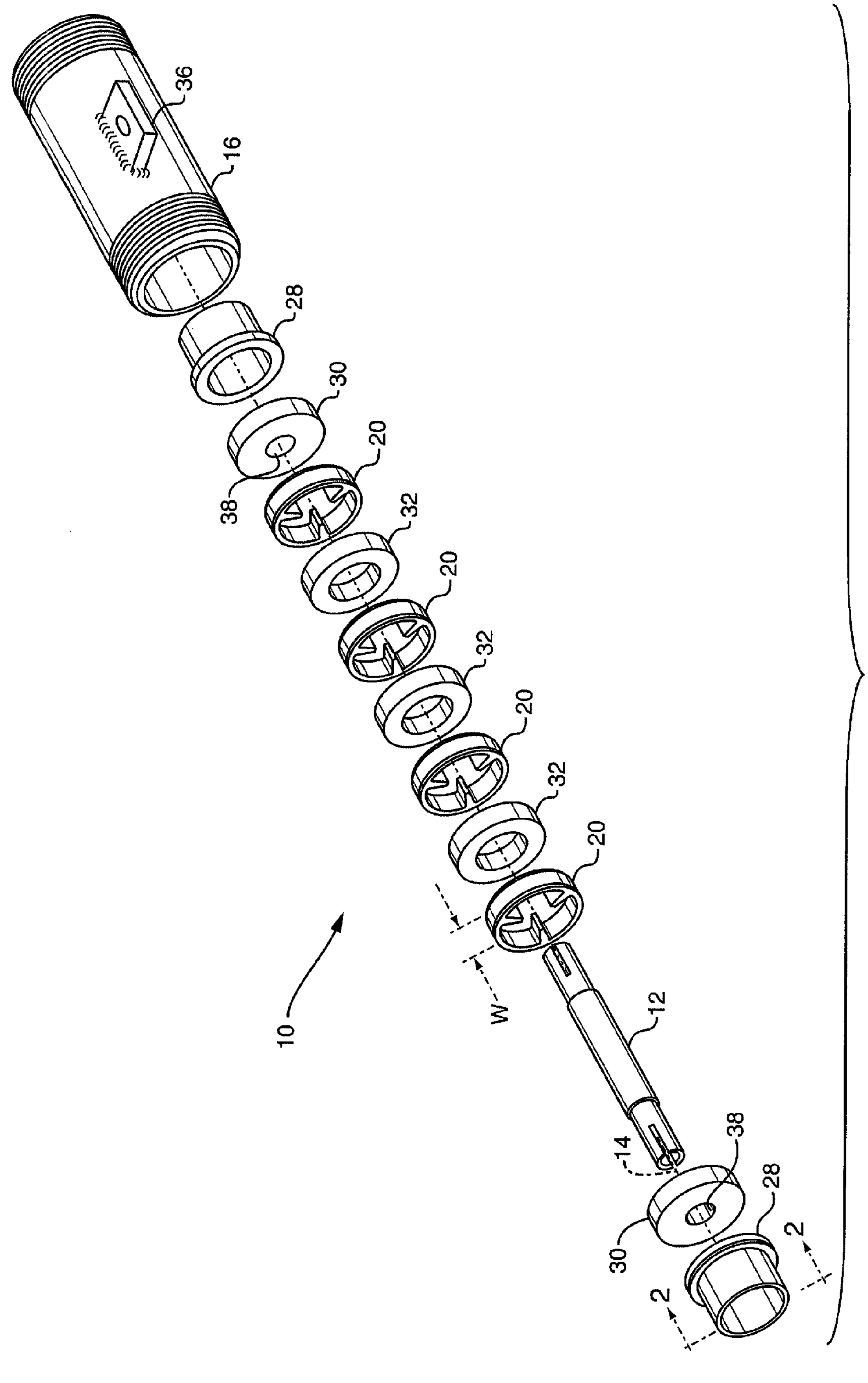
FIG. 1 is a perspective exploded view of a surge protector according to an embodiment of the invention.

An air gap surge arrestor for 75 ohm coaxial cable has been disclosed that dissipates an electrical surge up to 6,000 volts at 3,000 amps for a period of 50 microseconds, in accordance with IEEE Specification 62.41. Although the disclosed surge arrestor can be useful and may be advantageous for certain applications, it suffers from drawbacks.

One such problem noted with the surge arrestor configured for 75 ohm coaxial service is that it was designed for relatively small surges, such as a surge in an indoor line in the vicinity of a lightning strike. In such an application, only a small portion of the surge impulse is carried through the coaxial cable. A surge arrestor adapted for 50 ohm service in an outdoor transmission tower, however, may be very close to a lightning strike, or experience a direct hit. The energy impulse surging through the coaxial line may be orders of magnitude greater than the energy impulse in an indoor 75 ohm coaxial connector during the same surge event. Thus, the design of the disclosed 75 ohm surge protector is not scalable for use in 50 ohm service in transmission towers, for example. In accordance with IEEE Standard 62.41, a surge protector for use in a transmission tower (e.g., Location C with high exposure) may need to trip at 500 volts and dissipate up to 20,000 volts and 10,000 amps in 50 microseconds. The device disclosed for 75 ohm usage would surely melt during the energy surge present during a direct lightning strike because the device is typically very thin, on the order of 0.02 inches (0.51 millimeters). One possible solution is to stack the disclosed air gap surge arrestors in series to build up enough thickness to survive the energy surge, but stacking the devices negatively affects the characteristic impedance of the surge arrestor. Deviations as little as 1 or 2 ohms from the characteristic impedance of 50 ohms may cause unacceptable return losses in the coaxial line.

There is described herein one embodiment of a coaxial surge protector to dissipate the large energy surges in a lightning strike. The surge protector also mitigates the negative impact on characteristic impedance by incorporating tuning elements, as described below.

Referring to FIG. 1 of the drawings, a coaxial surge protector 10 incorporating the voltage surge protection device of the subject invention is illustrated. The surge protector 10 may be generally cylindrical in shape and include a center conductor 12 defining a central longitudinal axis 14. The center conductor 12 is adapted to mate with the center conductor of a coaxial connector. Depending on the particular application, the center conductor 12 may be metallic, such as copper, and further may be solid or hollow. In one example, the center conductor 12 includes a collet at each end configured to accept the male pin of a 7/16 DIN connector. The surge protector 10 further includes an electrically conductive outer body 16 concentrically surrounding the center conductor 12, and a dielectric layer 18 disposed between the center conductor 12 and the outer body 16. In the example illustrated in FIG. 1, the dielectric layer 18 is air, but other dielectric materials may be used, for example polycarbonate. The conductive outer body 16 may be rigid, as shown, or alternatively may include a flexible metal sheath surrounded by a protective outer jacket.

In one example, the surge protector 10 includes a connector interface to mate with a coaxial connector. The example connector interface shown in FIG. 1 is a female-female 7/16 DIN connector including a sleeve 28 adapted to guide a male 7/16 DIN connector (not shown). The connector interface may be selected from the group of connector interfaces consisting of a BNC connector, a TNC connector, an F-type connector, an RCA-type connector, a 7/16 DIN male connector, a 7/16 DIN female connector, an N male connector, an N female connector, an SMA male connector and an SMA female connector.

As mentioned above, the dielectric layer 18 in one example may be air, as shown in FIG. 1. The center conductor 12 must then be supported within the surge protector 10. In this configuration, the surge protector 10 further includes a center conductor support insulator 30 disposed in between and in contact with the center conductor 12 and the outer body 16. The support insulator includes a bore 38 centrally disposed therethrough for receiving the center conductor 12. The support insulator 30 may be fabricated from a non-conducting material, such as plastic, and concentrically aligns the center conductor 12 within the outer body 16 about axis 14. In the disclosed embodiment the support insulator 30 is a washer, but other configurations are possible. For example, the support insulator 30 may comprise an inner ring, an outer ring, and support arms joining the inner ring to the outer ring. Further, the inner ring and outer ring may be solid or segmented. The support insulator 30 is optional if the dielectric layer 18 layer is a solid, such as polycarbonate, because the dielectric layer 18 may provide the supporting function.

The surge protector 10 further includes a surge protective element 20 disposed concentrically about the axis 14 and in electrical contact with the outer body 16. The surge protective element 20 is composed of a conductive material, such as bronze, and is of a predetermined width W. In the disclosed embodiment, the outer diameter of the surge protective element 20 is press-fit into the outer body 16.

Figure 2:
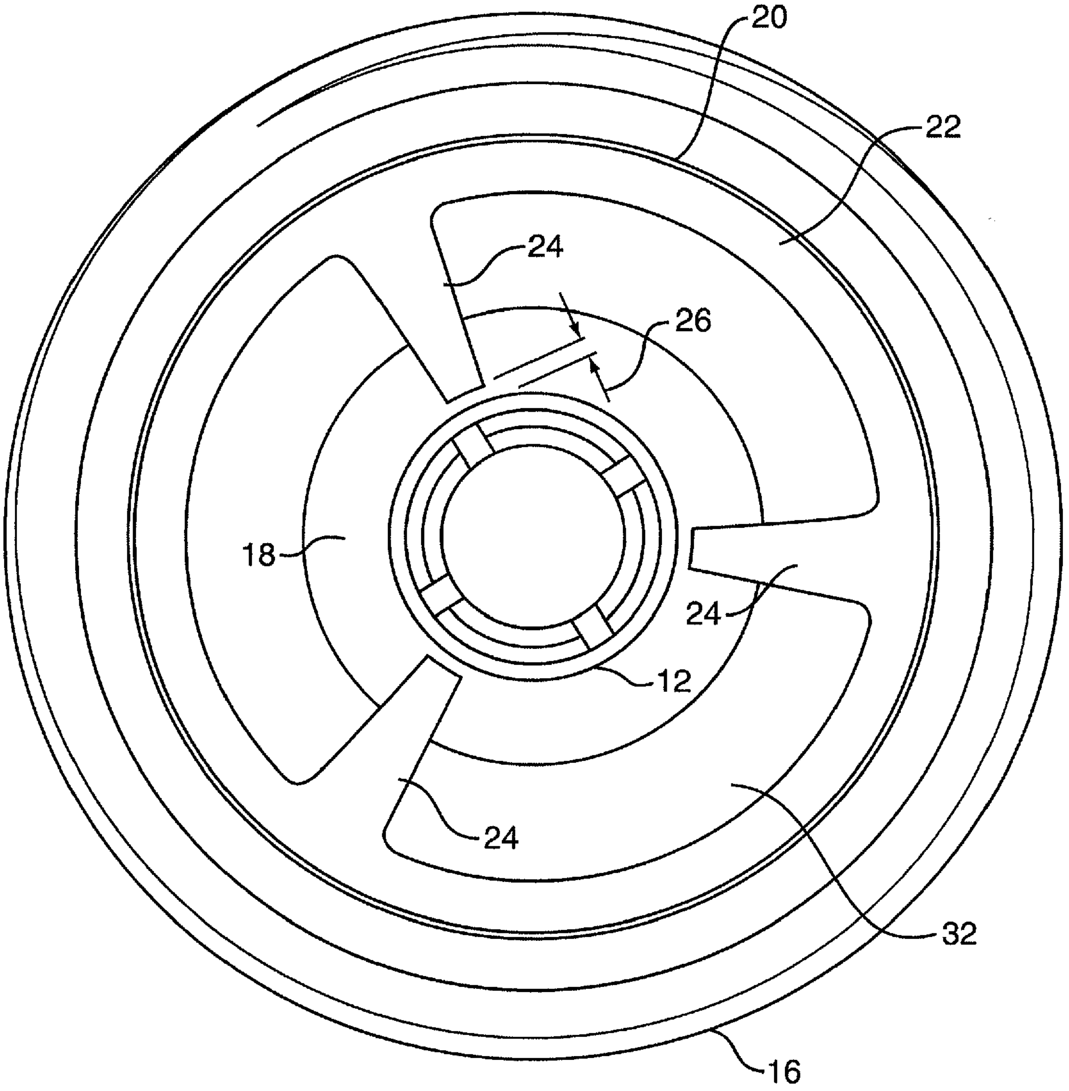
FIG. 2 is a cross sectional view of the surge protector shown in FIG. 1.

Referring to FIG. 2 of the drawings, in one example surge protective element 20 comprises a ring-shaped outer body 22 and at least one prong 24 extending radially inwardly therefrom.

Although surge protective element 20 as illustrated in the drawings includes three, equally spaced apart prongs 24, it has been found that four prongs 24 work just as well. In fact, the number of prongs 24 is not critical to the present embodiment; as one or more prongs 24 would suffice. Also, the prongs 24 do need not be equally spaced apart.

Depending on the particular usage and application, the surge protector 10 may include a single surge protective element 20 or a plurality of elements 20 spaced along the axis 14. In general, multiple surge protective elements 20 having multiple prongs 24 will enhance the useful life of the surge protector 10, but these benefits must be carefully weighed against impedance considerations, as will be discussed below.

The prongs 24 are disposed in spaced-apart relationship with the center conductor 12, meaning no portion of the surge protective element 20 physically contacts the center conductor 12. The combination of the surge protective element 20, the center conductor 12, and the spaced-apart relationship forms a spark gap 26 adapted to shunt to ground high voltage surges in the center conductor 12. In the disclosed embodiment, the spark gap 26 is comprised of air, which has a dielectric strength of 3,000,000 volts/meter. The size of the spark gap 26 dictates the threshold voltage level at which the electric current will arc from the center conductor 12 to the outer body 16. In one example, the spark gap 26 is adapted to arc when the center conductor voltage reaches 500 volts. The spark gap 26 would be approximately 0.007 inches (0.18 millimeters).

The 50 ohm coaxial transmission lines utilized in wireless communication towers may experience surges exceeding 100,000 volts during a lightning strike. Although the spark gap 26 may be configured to arc at voltages well below this value, for example 500 volts, the structure of the surge protective element 20 must be designed such that it can repeatedly withstand not only the high voltages but also the prolonged current density and high temperatures reached in the plasma phase during the arcing event. The width W and material composition of the surge protective element 20 are adapted to withstand these extremes.

Figure 3:
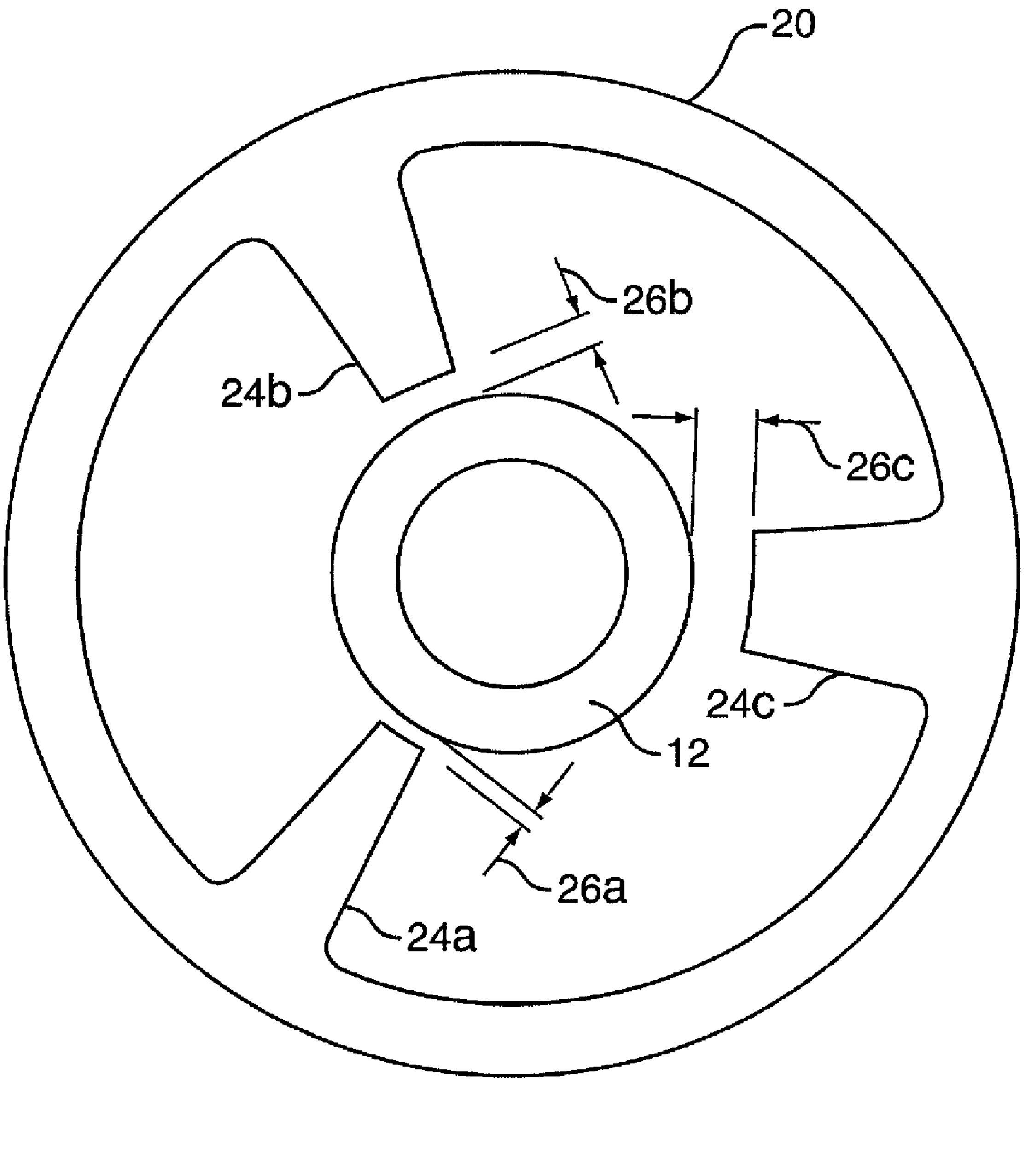
FIG. 3 is a cross sectional view of an alternate embodiment of the surge protective element shown in FIG. 2.

Referring to FIG. 3 of the drawings, an alternate embodiment of the present invention is shown wherein the spark gaps 26 are different sizes to accommodate different conditions. In one example, gap 26A is 0.007 inches (0.18 millimeters), which would arc at approximately 500 volts. Gap 26B is 0.026 inches (0.66 millimeters), which would arc at approximately 2,000 volts. Finally, gap 26C is sized at 0.079 inches (2.0 millimeters), which would arc at 6,000 volts. The corresponding prongs 24A-24C may also have differing widths, allowing for more robust configuration at higher voltages. In this manner, the surge protective element 20 provides a measure of insurance that, in the event of a very large surge, the larger-gap prongs would carry some the load. Further, if the smaller gaps 26A and/or 26B were to be consumed or damaged, an undamaged gap 26C may still be available.

Figure 4B:
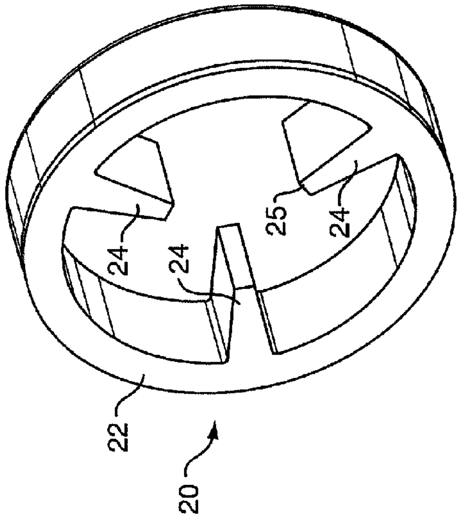
FIG. 4B is a cross sectional view of an alternate embodiment of the surge protective element.
Figure 4C:
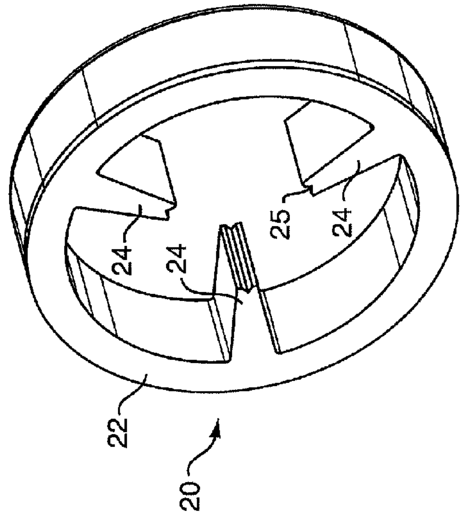
FIG. 4C is a cross sectional view of an alternate embodiment of the surge protective element.
Figure 4A:
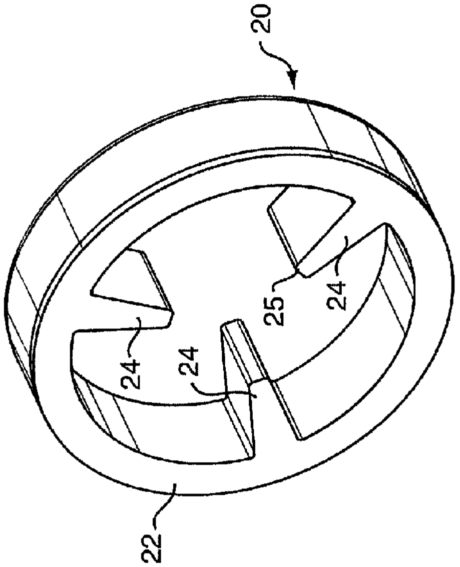
FIG. 4A is a cross sectional view of an alternate embodiment of the surge protective element.

Referring to FIGS. 4A-4C of the drawings, different configurations for the prong 24 of the surge protective element 20 are shown. In FIG. 4A, a tip 25 of one prong 24 is shown to include rounded off corners. In FIG. 4B, the tip 25 has a semi-cylindrical contour, thereby creating a parallel plate arrangement with the circular contour of the center conductor 12. FIG. 4C shows the tip 25 being notched. This configuration has the advantage of minimizing the capacitive effect of the prong-to-center conductor arrangement without losing the proximity of the gap or the majority of the current carrying capacity of the tip 25. Depending upon the particular requirements of the design, a configuration for the tip 25 may be selected that is most suitable.

In conventional connector design, it is desirable to match the impedance of the connector assembly as closely as possible to the characteristic impedance of the transmission line. As mentioned above, signals in the wireless communication industry may be transmitted between a cellular antenna tower and a base station using coaxial cable with a characteristic impedance of 50 ohms. Therefore, the surge protector 10 in one embodiment may be adapted to match a characteristic impedance of 50 ohms. Typically, each individual component in the connector assembly is designed with an effective impedance value that closely matches the characteristic impedance of the assembly. As used herein, the term "effective impedance" means the impedance value of the individual component in the assembly. In general, the effective impedance value for a coaxial section varies by the logarithm of the ratio of the outer conductor diameter to the center conductor diameter. In other words, for a given dielectric, the greater the distance between the two conductive diameters, the higher the effective impedance value. As can be seen with reference to FIG. 2, the diameter of the prong 24 is very close to the diameter of the center conductor 12, separated only by the spark gap 26. Thus, the local impedance value becomes very small, that is, the local contribution of the prong's impedance serves to lower the overall effective impedance value. Thus, the effective impedance value for the surge protective element 20 is negatively impacted by the prong 24. If the surge protective element 20 includes three or four prongs 24, the negative impact is exacerbated.

Additionally, the thickness W of the surge protective element 20 further affects the effective impedance value in a negative manner. Each of the configurations for the surge protective element 20 discussed above are adapted to withstand very large voltage spikes, in many cases greater than 1000 volts, and in some situations, up to 100,000 volts. Therefore, the width W of each surge protective element 20 may be quite thick in relation to other components in the surge protector 10 in order to carry the current. Whereas the thickness of the device disclosed in the 75 ohm example was approximately 0.020 inches thick, the width of the surge protective element 20 may be much thicker, in some examples more than an order of magnitude thicker. The thickness directly correlates to the cross-sectional surface area of the prong 24 and therefore to the amperage the element 20 may carry. In some examples, the cross-sectional area of the prongs 24 in sum is greater than the cross-sectional area of the center conductor 12. In this manner, the prongs 24 would be configured to carry at least as much current as the center conductor. In other examples, the width W of the surge protective element 20 may be 0.250 inches (0.64 centimeters) or even as much as three inches (7.6 centimeters), depending on the current capacity required of the design.

For simple geometric cross sections, the effective impedance value can be calculated according to known formulae. For complex cross sections, for example as illustrated in FIG. 2, commercially available software such as CST Microwave Studio® sold by Computer Simulation Technology is available to determine the effective impedance value.

With these considerations in mind and referring now back to FIG. 1 of the drawings, the surge protector 10 further includes an insulative tuning element 32 coupled to the surge protective element 20 in impedance-restorative relationship. The inventor of the present invention has recognized that the surge protective element 20 in close proximity to the center conductor 12 will not adversely affect the signal response of the surge protector 10 if the local zone of low impedance created by the spark gap 26 is compensated for elsewhere within the surge protector 10.

In general, the tuning element 32 will have a value of effective impedance greater than the value for the surge protective element 20 such that, in combination, the characteristic impedance of the surge protector 10 is restored to the design value. The tuning element 32 may be coupled purely to the surge protective element 20, or it may take into consideration all of the effective impedance values for each component in the surge protector 10. In the embodiment shown in FIG. 1, a plurality of tuning elements 32 are coupled to a plurality of surge protective elements 20. The impedance-restorative relationship may be created by arranging the tuning element 32 in physical contact with the surge protective element 20, as shown in FIG. 1, or by arranging the tuning element 32 anywhere along the axis 14 within the outer body 16.

The tuning element 32 may be made of an insulative material such as polycarbonate, DuPont™ Teflon®, or the like.

In one example, the impedance-restorative relationship is created by pairing one surge protective element 20 with one tuning element 32. The restorative impedance $Z_m$ of the tuning element 32 may be calculated generally according to the formula:

$$Z_m=\sqrt{Z_0 \times Z_{eff}} \quad (1)$$

where $Z_0$ is the characteristic impedance of the surge protector 10, and $Z_{eff}$ is the effective impedance of the surge protective element 20.

The particular arrangement and pairing of surge protective elements 20 and tuning elements 32 may vary depending on design considerations. For example, one alternate arrangement calls for a plurality of n electrically conductive surge protective elements 20 paired with a single tuning element 32. Each surge protective element 20 has an effective impedance value that would be considered in calculating a single effective impedance value $Z_{eff}$. As the number of elements increases, the individual effective impedances may be combined to a single effective impedance value $Z_{eff}$ using the aforementioned software CST Microwave Studio®.

Another alternate arrangement calls for a single surge protective element 20 paired with a plurality of m insulative tuning elements 32. Each tuning element 32 has an effective impedance value. The individual effective impedances may be combined to a single restorative impedance $Z_m$ using the aforementioned software CST Microwave Studio®.

A third alternate arrangement calls for a plurality of n electrically conductive surge protective elements 20 paired with a plurality of m insulative tuning elements 32. In this arrangement, the individual effective impedances may be combined to a single effective impedance value $Z_{eff}$ and the individual effective impedances may be combined to a single restorative impedance $Z_m$.

As may be appreciated with reference to the above alternate arrangements, a special case arises wherein the spacer 44 may be utilized as at least one of the tuning elements 32. Prior art spacers typically were designed to match the characteristic impedance of the connector, but as used herein, the spacer may be designed in an impedance-restorative relationship with the surge protective element 20.

The voltage surge in the coaxial transmission line must be shunted to ground. In one example, the surge protector 10 is utilized to accomplish this function by transmitting the voltage spike from the center conductor 12 across the spark gap 26, to the outer body 16, and to ground. The surge protector 10 may include a grounding element 36 in electrical communication with the outer body 16. In the disclosed embodiment, the grounding element 36 is a lug securely fixed to the outer body 16, for example by welding, to assure proper electrical transmission. Other examples of the grounding element 36 include a grounding stud or strap-type grounding clamps.

Figure 5:
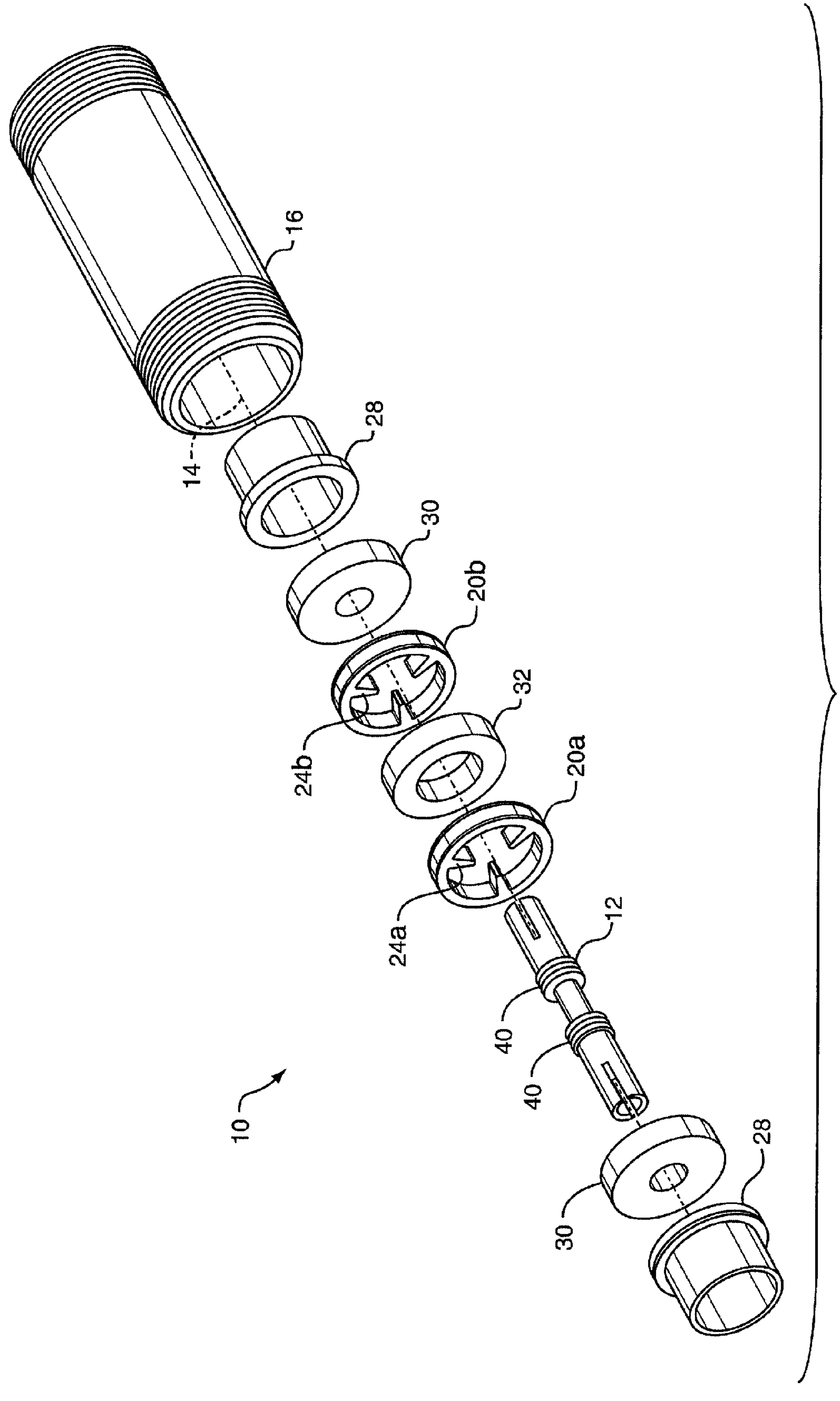
FIG. 5 is a perspective exploded view of a surge protector according to another embodiment of the invention.
Figure 6:
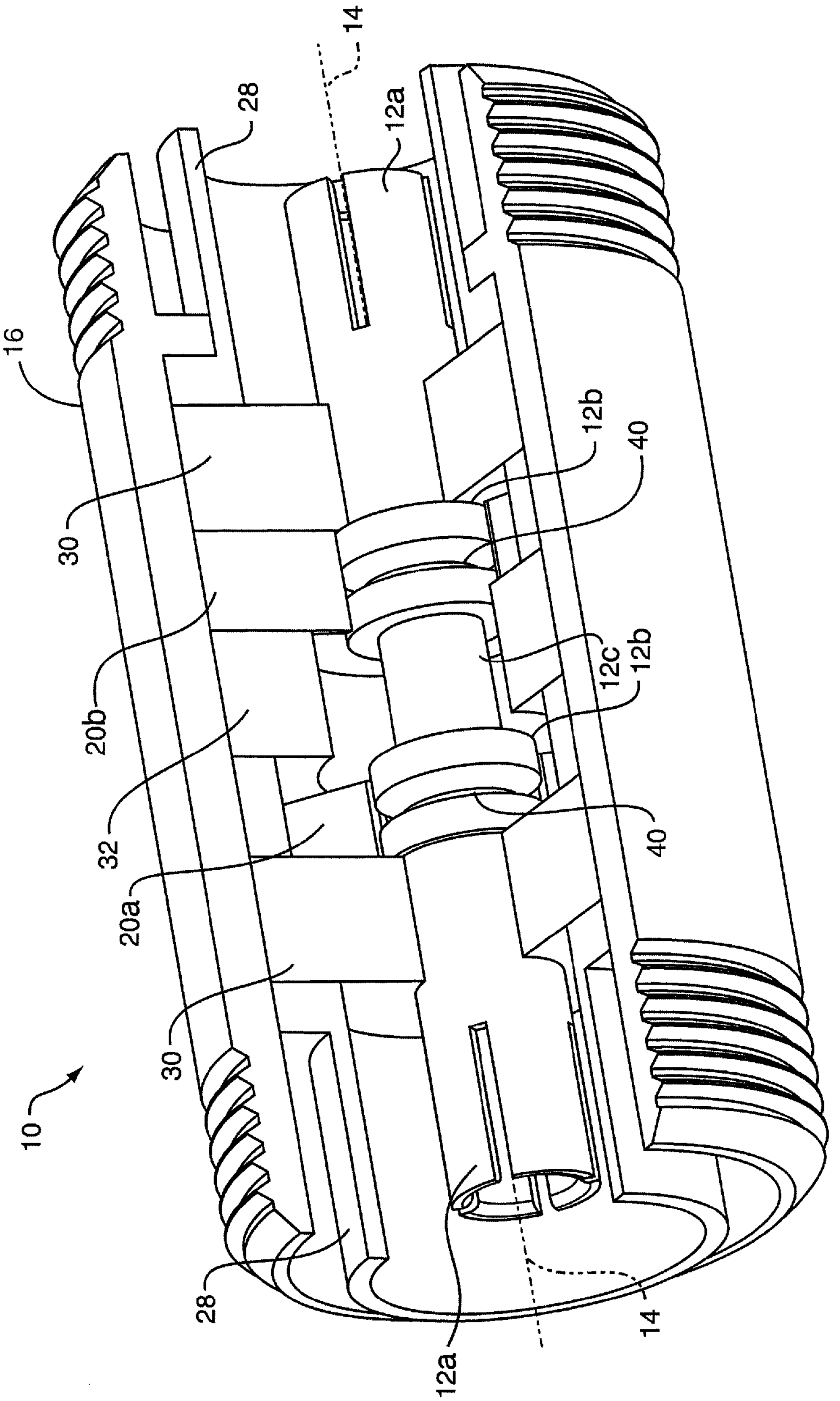
FIG. 6 is a cross sectional view of the surge protector shown in FIG. 4.

Referring to FIGS. 5 and 6 of the drawings, the surge protector 10 includes two surge protective elements 20A, 20B and one tuning element 32. The center conductor 12 has an irregular shape. Section 12A has essentially the same configuration as disclosed in previous embodiments. The center conductor 12 has an outwardly projecting diameter section 12B, including a V-notch 40 that serves to enhance the ability of an arc to travel across the spark gap 26 by directing surges to the tip 25 of the prongs 24. The V-notch 40 also reduces the amount of capacitance that is created between the semi-circular portion of the surge tip 25 and the cylindrical portion 12B of the center conductor 12. The reduction in capacitance helps to mitigate the low impedance created by the surge protective element 20. Section 12C of the center conductor has a reduced diameter in area of the tuning element 32 to improve the effective impedance value. In the arrangement shown, a higher effective impedance value may be achieved for the tuning element 32 by increasing the radial distance of the dielectric layer comprised of air.

The prongs 24 of the surge protective elements 20A, 20B do not have to be in the same angular orientation with respect to the axis 14. As best seen in FIG. 5, the prongs on surge protective element 20B are rotated approximately 60 degrees with respect to the prongs on surge protective element 20A.

Figure 7:
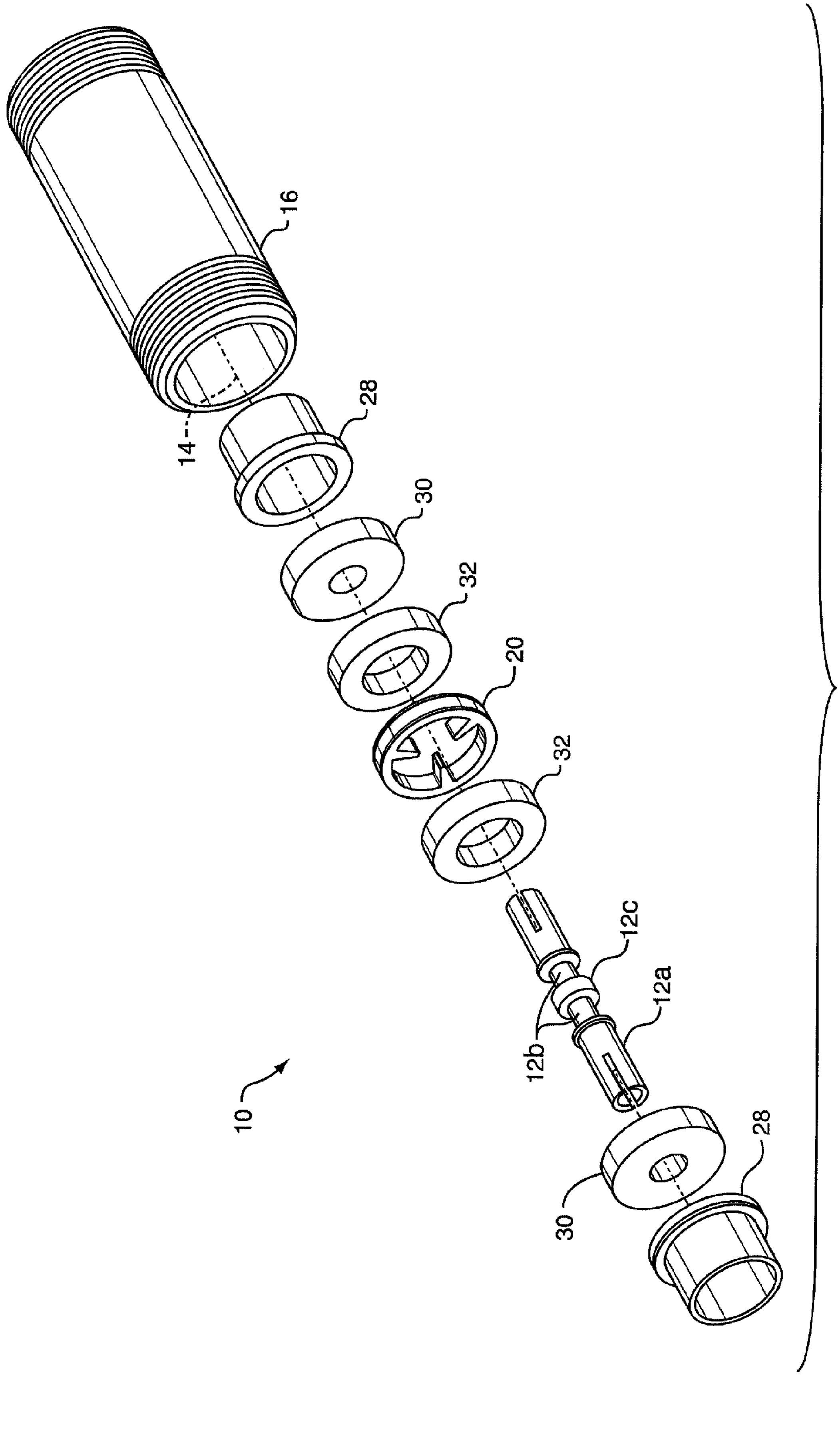
FIG. 7 is a perspective exploded view of a surge protector according to another embodiment of the invention.
Figure 8:
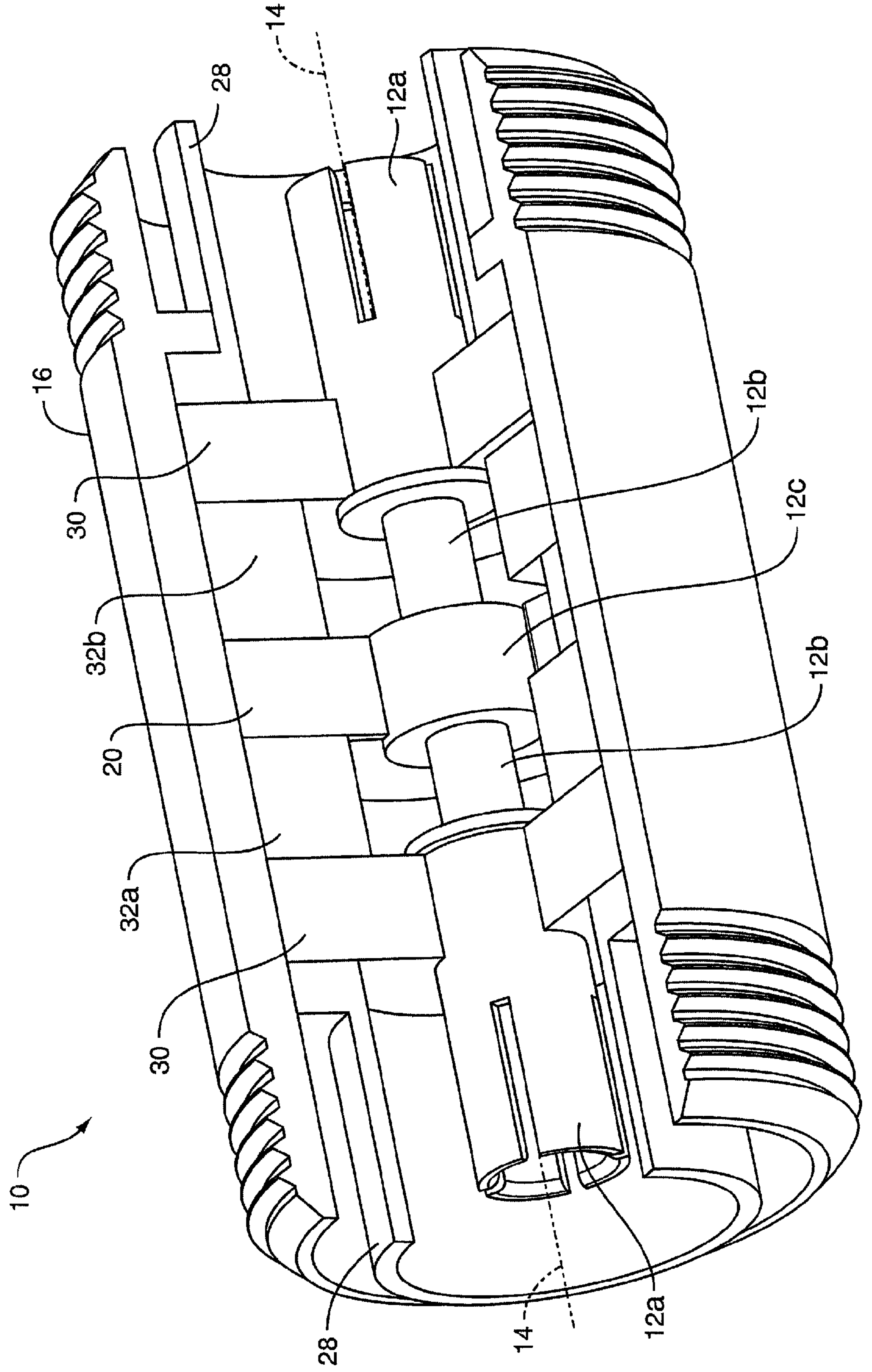
FIG. 8 is a cross sectional view of the surge protector shown in FIG. 6.

Referring to FIGS. 7 and 8 of the drawings, another embodiment of the surge protector 10 includes one surge protective element 20 and two tuning elements 32A, 32B. The center conductor 12 has an irregular shape. Section 12A has essentially the same configuration as disclosed in previous embodiments. Section 12B of the center conductor has a reduced diameter in area of the tuning elements 32A, 32B to improve the effective impedance value. In the arrangement shown, a higher effective impedance value may be achieved for the tuning element 32A, 32B by increasing the radial distance of the dielectric layer comprised of air. Section 12C of the center conductor has an outwardly projecting diameter greater than the diameter of section 12A.

Although not shown in the accompanying drawings, the center conductor 12 may include protrusions, similar to the prongs 24 of the surge protective element 20, and the surge protective element 20 may be devoid of protrusions, comprising only the ring-shaped outer body 22.

Figure 9:
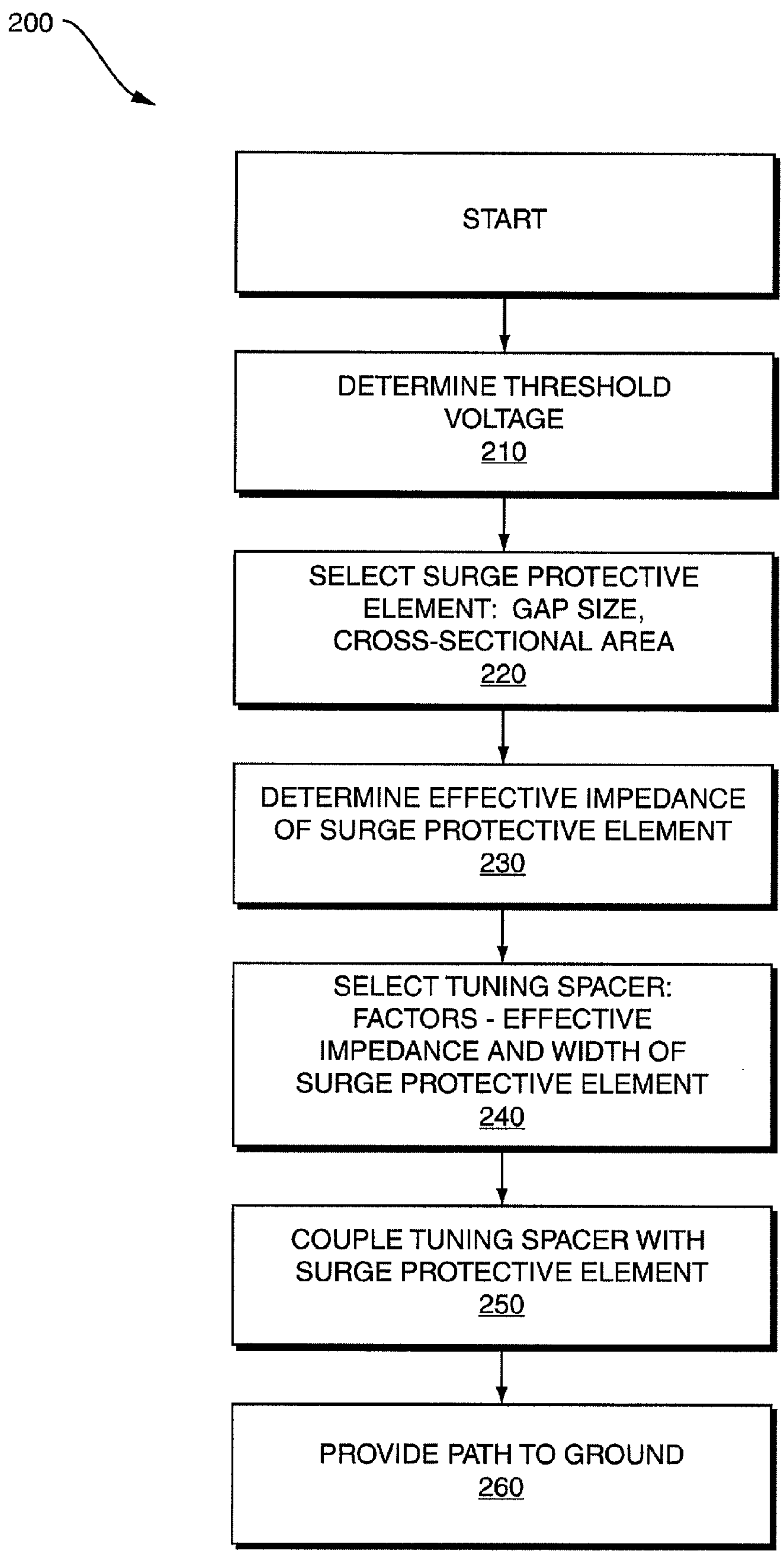
FIG. 9 is a block diagram of a method for providing a high voltage surge protector in accordance with an embodiment of the present invention.

Referring now to FIG. 9 of the drawings, a method 200 is shown for providing high voltage surge protection for a coaxial cable. The method 200 comprises a step 210 of determining a threshold voltage for which surge protection is desired. As defined herein, threshold voltage is the value that causes the voltage in the center conductor to jump to the surge protective element 20. In one example, the threshold voltage is 500 volts, meaning equipment connected to the coaxial cable must be able to withstand 500 volts for a brief period. The method 200 further comprises a step 220 of selecting a surge protective element 20 for use with the threshold voltage. One factor to be considered when selecting the element 20 includes the size of the spark gap 26. The spark gap 26 will be sized according to (1) the dielectric layer 18 separating the center conductor 12 and the outer body 16 and, (2) the threshold voltage to which surge protection is desired. Other factors to be considered when selecting the surge protective element 20 include the number and cross-sectional area of the prong (s) 24, which have a bearing on the robustness of the surge protector 10, its durability, and the number of surges the surge protector 10 will be able to withstand. In one example, the cross-sectional area of the prong is greater than the cross-sectional area of the center conductor. In another example, the selection of the surge protective element 20 includes selecting a plurality of surge protective elements 20 in the arrangement.

When the selection of the surge protective element 20 is complete, the first effective impedance value of the element can be determined at a step 230. The first effective impedance value may be calculated using CST Microwave Studio®, for example. Due to the geometry of the surge protective element 20, i.e. the prongs 24 being closely spaced to the center conductor 12, the first effective impedance value will likely fall below the characteristic impedance of the coaxial transmission line.

At a step 240, the tuning element 32 is selected with a second effective impedance value that is greater than the first effective impedance value for the surge protective element 20. The second effective impedance value is selected such that when paired with the first effective impedance value, the characteristic impedance of the coaxial connector will essentially equal characteristic impedance of the transmission line. By "essentially equal", what is meant is that the differences in the impedances will not adversely affect the signal response of the transmission through the connector. The surge protective element 20 and the tuning element 32 are coupled within the connector in impedance-restorative relationship at a step 250, for example by assembling the two components in physical contact with each other. In some examples, a path to ground from the outer body 16 may be necessary. Therefore, the method 200 further includes a step 260 of providing the grounding element 36.

One advantage of the present invention is that very large surges, for example in excess of 20,000 volts at 10,000 amps for 50 microseconds, may be accommodated in the coaxial line without resort to multiple surge protection devices. Unlike the quarter wave stub, the surge protector of the present invention is able to pass dc power because the center conductor 12 maintains electrical continuity throughout the surge event. Also, the surge protector of the present invention is not subject to "leaking" current to ground when degraded.

Another advantage of the disclosed surge protector 10 is that there are virtually no constraints on the width W of the surge protective element 20. Prior art surge protective elements attempted to minimize the width to minimize the negative impacts on impedance and signal response. Removing the constraint on the width W by coupling a tuning element 32 allows a more robust design, and further allows the surge protective element 20 to be designed for much greater voltages at significantly higher current.

Another advantage of the disclosed surge protector 10 is that its effective performance band is not limited to a narrow band of frequencies. Whereas the quarter wave stub may be useful in a very limited range of frequencies about 10 megahertz wide, the present invention does not suffer from such limitations. In other words, the surge protector 10 does not act as a band pass filter in the manner a quarter wave stub does. The surge protector 10 of the present invention is adapted to operate throughout a broad frequency spectrum that includes 470 megahertz (beginning of UHF band) up to 3 gigahertz (cellular frequencies), including the WiMAX frequency spectrum. Moreover, because the tuning element 32 restores the characteristic impedance to that of the line impedance (e.g., 50 ohms), the return losses within the effective performance band are no less than 20 decibels. In fact, for an effective performance band comprised of a discrete frequency range, such as the group consisting of 800-870 MHz, 824-896 MHz, 870-960 MHz, 1425-1535 MHz, 1700-1900 MHz, 1850-1990 MHz, 2110-2170 MHz, and 2300-2485 MHz, the return loss is greater than 30 decibels and, in some cases, greater than 40 decibels.

The disclosed surge protector 10 is predicted to last longer than conventional gas tubes. In addition, the surge protector 10 does not leak current when nearing the end of its useful life. Further, when compared to gas tubes, the disclosed surge protector 10 has a faster response time, meaning that less voltage and/or current is allowed to travel down the transmission line before the surge is shunted.

The surge protector 10 is of much simpler construction than either the gas tube or quarter wave stub, and therefore more economical to manufacture.

Although the surge protector 10 disclosed herein has been described with reference to a 50 ohm coaxial cable, it will be understood by those skilled in the art that the invention is not so limited. For example, the surge protector 10 of the present invention may also be suitable for 75 ohm coaxial cable, such as that utilized with CATV. Other various modifications and the like could be made thereto without departing from the scope of the invention as defined in the following claims.

I claim:

1. A high voltage surge protection device having a characteristic impedance, the device comprising:

- a center conductor defining an axis;
- an electrically conductive outer body disposed in surrounding relation to the center conductor;
- a dielectric layer disposed between the center conductor and the outer body;
- an electrically conductive surge protective element having a first value of effective impedance, the surge protective element disposed in electrical contact with the outer body and in spaced-apart relationship with the center conductor, the spaced-apart relationship forming a gap between the center conductor and the electrically conductive surge protective element;
- an insulative tuning element having a second value of effective impedance larger than the first value of effective impedance, the tuning element being coupled to the surge protective element in impedance-restorative relationship; and wherein the combination of the first value of effective impedance and the second value of effective impedance effectively equals the characteristic impedance of the high voltage surge protection device.

2. The high voltage surge protection device of claim 1 wherein the dielectric layer is air and the surge protection device further comprises a support insulator centrally disposed along the axis in between and in contact with the center conductor and the outer body, the support insulator having a bore centrally disposed therethrough for receiving the inner conductor.

3. The high voltage surge protection device of claim 2 wherein the surge protective element comprises the support insulator.

4. The high voltage surge protection device of claim 1 wherein the gap is configured to discharge a voltage of greater than 500 volts.

5. The high voltage surge protection device of claim 4 wherein the gap is in a range of between 0.005 inches and 0.030 inches.

6. The high voltage surge protection device of claim 5 wherein the surge protective element comprises a ring-shaped outer body and a plurality of prongs extending radially inwardly therefrom, the gap associated with each prong having a different size.

7. The high voltage surge protection device of claim 4 wherein the surge protective element has a cross sectional area greater than a cross sectional area of the center conductor.

8. The high voltage surge protection device of claim 7 wherein the cross sectional area of the surge protective element is configured to discharge at least 20,000 volts at 10,000 amps for at least 50 microseconds.

9. The connector of claim 1 wherein the characteristic impedance is 50 ohms.

10. The surge protection device of claim 1 wherein the characteristic impedance is 75 ohms, and the surge protective element is configured to discharge more than 6,000 volts at 3,000 amps for a period of 50 microseconds.

11. The surge protection device of claim 1 wherein the surge protective element is a plurality of n electrically conductive surge protective elements, each having an effective impedance value, the first value of effective impedance being equal to the combination of the n values of effective impedance.

12. The surge protection device of claim 1 wherein the tuning element is a plurality of m insulative tuning elements, each having an effective impedance value, the second effective impedance value being equal to the combination of the m values of effective impedance.

13. The surge protection device of claim 12 wherein the surge protective element is a plurality of n electrically conductive surge protective elements, each having an effective impedance value, the first value of effective impedance being equal to the combination of the n values of effective impedance.

14. The connector of claim 1 wherein the tuning element physically contacts the surge protective element.

15. A coaxial connector comprising:

a center conductor defining an axis;

an electrically conductive outer body disposed in surrounding relation to the inner conductor;

a dielectric layer disposed between the center conductor and the outer body;

an electrically conductive surge protective element disposed in surrounding relation to the inner conductor and having at least one prong, the prong in spaced-apart relationship with the center conductor, wherein the spaced-apart relationship forms a gap between the electrically conductive surge protective element and the center conductor; and an insulative tuning element disposed in surrounding relation to the inner conductor, the tuning element being in physical contact with the surge protective element;

wherein the coaxial connector has an effective performance band in the range of 470 megahertz to 3,000 megahertz and a return loss of no less than 20 decibels within the effective performance band.

16. The coaxial connector of claim 15 further comprising a support insulator disposed in between and in contact with the center conductor and the outer body.

17. The coaxial connector of claim 15 wherein the outer body is includes a connector interface selected from the group of connector interfaces consisting of a BNC connector, a TNC connector, an F-type connector, an RCA-type connector, a 7/16 DIN male connector, a 7/16 DIN female connector, an N male connector, an N female connector, an SMA male connector and an SMA female connector.

18. The coaxial connector of claim 15, further comprising a grounding element secured to the outer body and adapted to transmit a voltage surge from the outer body to ground.

19. The coaxial connector of claim 15 wherein the effective performance band is selected from the group consisting of 800-870 MHz, 824-896 MHz, 870-960 MHz, 1425-1535 MHz, 1700-1900 MHz, 1850-1990 MHz, 2110-2170 MHz, and 2300-2485 MHz, and the return loss is greater than 30 decibels within the effective performance band.

20. In a coaxial connector having a center conductor forming an axis and a plurality of elements disposed in serial relationship concentric to the axis, including at least an outer body and a dielectric layer disposed between the center conductor and the outer body, the connector having a target characteristic impedance and each element having an effective impedance, a method for providing high voltage surge protection comprising the steps of:

determining a threshold voltage for which the surge protection is desired;

selecting an electrically conductive surge protective element in spaced-apart relationship with the center conductor to form a gap between the electrically conductive surge protective element and the center conductor, the spaced-apart relationship determined by the threshold voltage value which will arc from the center conductor to the surge protective element, the surge protective element in electrical contact with the outer body and having a first effective impedance value;

selecting an insulative tuning element having a second effective impedance value greater than the first effective impedance value, the second effective impedance value being determined such that the effective impedance value of each element combined with the first effective impedance value and the second effective impedance value essentially equals the target characteristic impedance; and coupling the surge protective element and the tuning element within the connector in impedance-restorative relationship.

21. The method of claim 20 wherein the step of selecting an electrically conductive surge protective element is further determined by selecting a cross-sectional area of the prong that is greater than a cross-sectional area of the center conductor.

22. The method of claim 20 wherein the second effective impedance value is determined such that the combination of only the first effective impedance value and the second effective impedance value essentially equal the target characteristic impedance.

23. The method of claim 20 wherein the threshold voltage is about 500 volts.

24. The method of claim 20 wherein the coaxial connector further includes a grounding element, and the method further comprises the step of shunting the voltage from the outer body to ground.

* * * * *